United States Patent [19]
Kondo

[11] Patent Number: 5,764,372
[45] Date of Patent: Jun. 9, 1998

[54] FACSIMILE MACHINE WITH A MECHANISM CAPABLE OF TRANSMITTING POWER FROM A SINGLE MOTOR TO VARIOUS GEAR TRAINS

[75] Inventor: Hakudai Kondo, Nagoya, Japan

[73] Assignee: Brother Kogyo Kabushiki Kaisha, Nagoya, Japan

[21] Appl. No.: 641,749

[22] Filed: May 2, 1996

[30] Foreign Application Priority Data

May 12, 1995 [JP] Japan ................... 7-114649

[51] Int. Cl.$^6$ ........................................... H04N 1/36
[52] U.S. Cl. .................. 358/414; 358/412; 358/498
[58] Field of Search .................................. 358/400, 401, 358/414, 498, 296, 412, 419

[56] References Cited

U.S. PATENT DOCUMENTS

| | | | |
|---|---|---|---|
| 4,540,273 | 9/1985 | Tamura | 399/231 |
| 5,391,009 | 2/1995 | Stodder | 355/308 |
| 5,422,732 | 6/1995 | Takayanagi | 358/498 |
| 5,594,486 | 1/1997 | Kiyohara | 347/104 |
| 5,651,623 | 7/1997 | Stodder et al. | 400/605 |

FOREIGN PATENT DOCUMENTS 7-130040  5/1995  Japan ..................... G11B 15/10

*Primary Examiner*—Kim Yen Vu
*Assistant Examiner*—Kimberly A. Williams
*Attorney, Agent, or Firm*—Oliff & Berridge, PLC

[57] ABSTRACT

A facsimile machine including a motor capable of being driven to selectively produce forward power and reverse power; a first operation portion for performing a first operation of the facsimile machine; a second operation portion for performing a second operation of the facsimile machine; a first gear train for, when the facsimile machine is in a first mode, transmitting reverse power from the motor to drive the first operation portion; a second gear train for, when the facsimile machine is in a second mode, transmitting reverse power from the motor to drive the second operation portion; and a mode switching member driven by forward power from the motor to switch the facsimile machine between the first mode and the second mode.

14 Claims, 9 Drawing Sheets

MODE SWITCHING OPERATION

FIG. 3  DOCUMENT RETRIEVAL MODE

FIG. 5 RECORD MODE

FIG. 6  COPY MODE

FIG. 7 SHEET-DISCHARGE MODE

FACSIMILE MACHINE WITH A MECHANISM CAPABLE OF TRANSMITTING POWER FROM A SINGLE MOTOR TO VARIOUS GEAR TRAINS

BACKGROUND OF THE INVENTION

1. Field of the Invention

The present invention relates to a facsimile machine including a power transmission mechanism for transmitting power to a document retrieval portion and to an image recording portion of the facsimile machine, so as to enable transport of a continuous ink sheet and a cut sheet to the image recording portion, thereby allowing images to be recorded or copied on the cut sheet using the continuous ink sheet.

2. Description of the Related Art

There has been known a conventional facsimile machines with a recording portion capable of recording or copying images onto a cut sheet using a continuous ink sheet. However, the ink sheet is transported through the recording portion even when the facsimile machine is not in a record or copy mode. Portions of the ink sheet which pass through the recording portion when the facsimile machine is not in the record or copy mode will be wasted.

To prevent this waste of ink sheet, there has been known a facsimile machine provided with two separate motors: one for controlling drive of a gear train for transporting the ink sheet; and another for controlling drive of another gear train, for example, a document-transport gear train for passing a document through a document retrieval portion and a sheet-feed/discharge gear train for transporting a cut sheet through the recording portion. A power switching mechanism is provided for selectively driving the separate motors. With this configuration, the ink sheet can be transported only during the record mode or the copy mode.

SUMMARY OF THE INVENTION

However, even if the ink sheet is transported only during the record mode or the copy mode, ink sheet will pass through the record portion unused while the cut sheet is being transported from a sheet-supply portion to the recording portion. Again, the ink sheet is wasted. Also, because this configuration requires more than one motor, the facsimile machine is expensive to produce.

It is an objective of the present invention to overcome the above-described problems and to provide a facsimile machine with lower manufacturing costs and lower running costs.

To achieve the above-described objectives, a facsimile machine according to the present invention includes a motor capable of being driven to selectively produce forward power and reverse power; a first operation portion for performing a first operation of the facsimile machine; a second operation portion for performing a second operation of the facsimile machine; a first gear train for, when the facsimile machine is in a first mode, transmitting reverse power from the motor to drive the first operation portion; a second gear train for, when the facsimile machine is in a second mode, transmitting reverse power from the motor to drive the second operation portion; and mode switching means driven by forward power from the motor to switch the facsimile machine between the first mode and the second mode.

BRIEF DESCRIPTION OF THE DRAWINGS

The above and other objects, features and advantages of the invention will become more apparent from reading the following description of the preferred embodiment taken in connection with the accompanying drawings in which.

Figure 1:
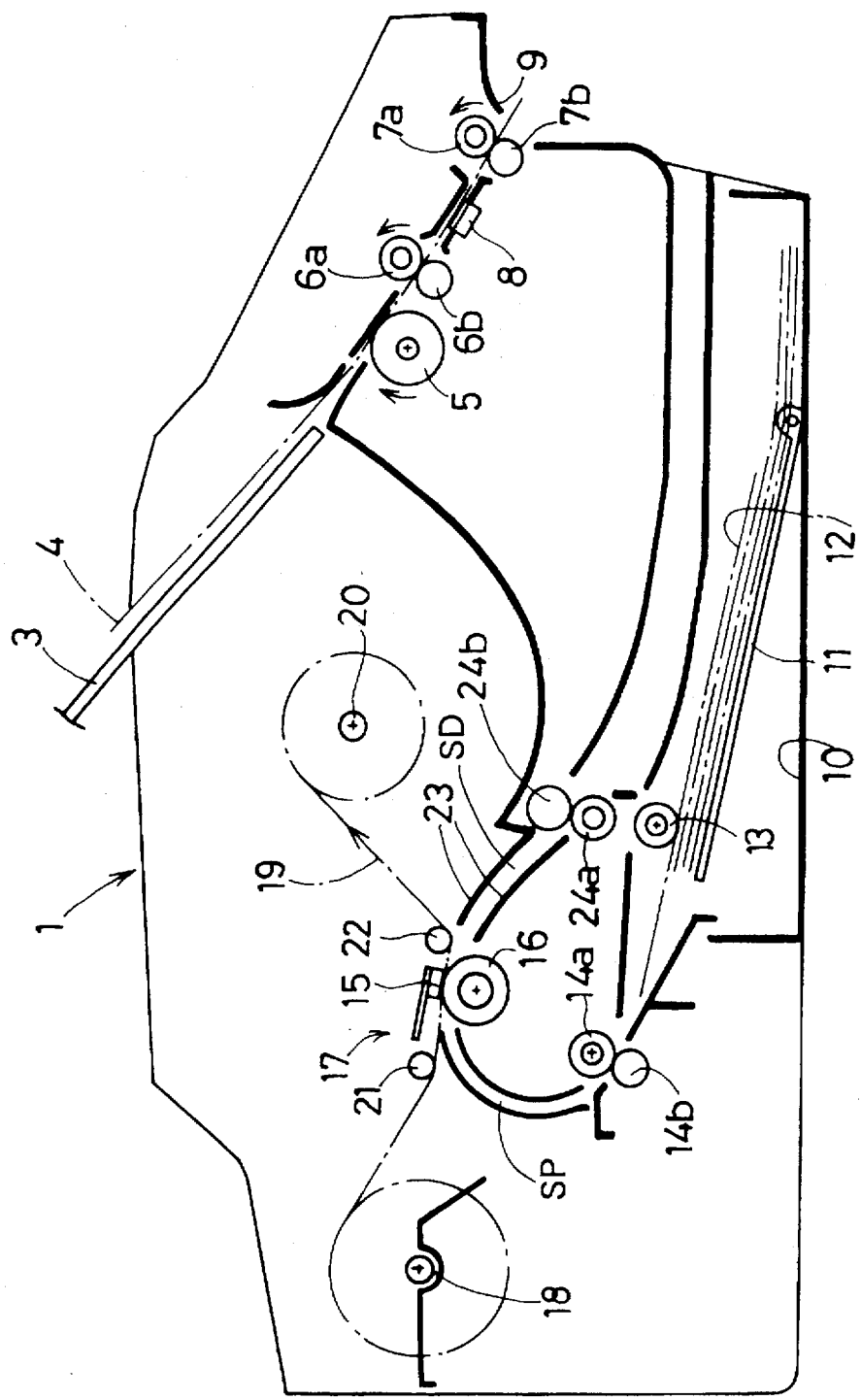
FIG. 1 is a cross-sectional view showing a facsimile machine according to the present invention.

DETAILED DESCRIPTION OF THE PREFERRED EMBODIMENTS facsimile machine according to a preferred embodiment of the present invention will be described while referring to the accompanying drawings wherein like parts and components are designated by the same reference numerals to avoid duplicating description.

FIG. 1 is a cross-sectional view schematically showing a facsimile machine 1 to which the present invention is applied. The facsimile machine 1 includes a facsimile function, a copy function, and a recording function. The facsimile function enables the facsimile machine 1 to retrieve an image from a document and transmit the image as image data to a remote facsimile machine. The recording function enables the facsimile machine 1 to record image data received from a remote facsimile machine onto a cut sheet, which serves as a recording sheet. The copy function enables the facsimile machine 1 to copy an image retrieved from a document onto a cut sheet. To accomplish these three different functions, the facsimile machine 1 includes five modes, that is, a document-retrieval mode, a sheet-supply mode, a record mode, a copy mode, and a sheet-discharge mode.

Next, an explanation will be provided for the five different modes and related components of the facsimile machine 1.

The document-retrieval mode is for retrieving an image from a document to be transmitted or copied. The following text is an explanation of components for executing the document-retrieval mode. A document retrieval portion including a CCD scanner 8 is disposed along a document-transport pathway spanning between a slanting document tray 3 provided to the upper rear of the facsimile machine 1 and a document discharge port 9 provided at the rear side of the facsimile machine 1. Other components disposed along the document-transport pathway include a retrieval separation roller 5 at the lower internal end of the document tray 3; a pair of retrieval transport rollers 6a, 6b at an upstream side of the CCD scanner 8; and a pair of retrieval-discharge rollers 7a, 7b at a downstream side of the CCD scanner 8.

A document 4 placed on the document tray 3 is transported by the retrieval separation roller 5 and the pair of retrieval transport rollers 6a, 6b through the CCD scanner 8, where the image of the document 4 is retrieved. The document 4 is then discharged through the document discharge port 9 and onto a discharge tray (not shown in the drawings) by the pair of retrieval-discharge rollers 7a, 7b.

The sheet-supply mode involves preparatory steps for copying using the copy mode or for recording images based on image data received from a remote facsimile machine. The following text is an explanation of components required for executing the sheet-supply mode. A sheet-supply cassette 10 having a sheet-bearing plate 11 is disposed in the lower portion of the facsimile machine 1. Cut sheets 12, which serve as recording sheets, are stacked on the sheet-bearing plate 11. A sheet-supply roller 13 for removing one sheet at a time from the stack of cut sheets 12 is disposed above the sheet-supply cassette 10. A pair of transport rollers 14a, 14b for transporting the cut sheets 12 along a sheet-supply pathway SP are disposed on either side of the sheet-supply pathway SP downstream from the sheet-supply roller 13.

During the sheet-supply mode, one cut sheet 12 at a time is removed by the sheet-supply roller 13 from the stack on the sheet-bearing plate 11 and then transported along the sheet-supply pathway SP by the pair of transport rollers 14a, 14b toward an image recording portion 17. The image recording portion 17 includes a line type thermal head 15 and a platen roller 16, which together define a print position therebetween. When the lead edge of a cut sheet 12 is transported to directly in front of the print position, transportation of the cut sheet 12 is temporarily stopped.

It should be noted that an ink sheet 19 (to be described later), is not transported during the sheet-supply mode. When the facsimile machine 1 enters the record mode (to be described later), the ink sheet 19 is transported at the same speed as the cut sheets 12. This configuration enables printing without wasting ink sheet 19.

The record mode is for recording image data that the facsimile machine 1 receives from a remote facsimile machine. The following text is an explanation of components for executing the record mode. A supply reel 18 and a take-up reel 20 are disposed on either side of the image recording portion 17. The continuous ink sheet 19 mentioned above has the same width as that of the cut sheets 12 and is wrapped around the supply reel 18 and onto the take-up reel 20. A front guide roller 21 and a rear guide roller 22 are provided on either side of the image recording portion 17. The ink sheet 19 stretching between the supply reel 18 and the take-up reel 20 is threaded to abut the front guide roller 21 and the rear guide roller 22 and to pass between the platen roller 16 and the platen roller 16.

During the record mode, the cut sheet 12 waiting in front of the print position of the image recording portion 17 is further transported by drive of the pair of transport rollers 14a, 14b to the image recording portion 17. Directly before the cut sheet 12 is sandwiched between the line type thermal head 15 and the platen roller 16, the take-up reel 20 is driven to draw the ink sheet 19 from the supply reel 18 so that it passes between the line type thermal head 15 and the platen roller 16 at the same speed as the cut sheet 12. The cut sheet 12 is transported in the record mode until it passes the point where its rear edge separates from the ink sheet 19 at the downstream side of the image recording portion 17. It should be noted that during the record mode, the transport roller 14a, the platen roller 16, and a sheet-discharge roller 24a (to be described later) are driven, whereas the sheet-supply roller 13 is not.

The sheet-discharge mode is for transporting the cut sheet 12 after the record mode. The sheet-discharge mode is also used to discharge a cut sheet 12 stopped during passage through the image recording portion 17 when a printing error or an image reception error occurs in the facsimile machine 1. The following text is an explanation of components for executing the sheet-discharge mode. Two guide plates 23, 23 are disposed on either side of a sheet-discharge pathway SD downstream from the image recording portion 17. A pair of sheet-discharge rollers 24a, 24b are disposed on either side of a sheet-discharge pathway SD downstream from the guide plates 23, 23. After passing through the image recording portion 17, the cut sheet 12 passes between the guide plates 23, 23, is picked up by the pair of sheet-discharge rollers 24a, 24b, and is then discharged from the front side of the facsimile machine 1 onto a sheet tray (not shown in the drawings). It should be noted that during the sheet-discharge mode, the transport roller 14a and the discharge roller 24a are driven, but not the sheet-supply roller 13 or the take-up reel 20. Therefore, the cut sheet 12 is discharged without transporting the ink sheet 19.

The copy mode is for copying images from documents and recording the images onto a cut sheet 12. First, the image of a document 4 to be copied is retrieved using the CCD scanner 8 of the document retrieval portion. The resultant image data is reproduced using the image recording portion 17. Therefore, the retrieval separation roller 5, the retrieval transport roller 6a, the retrieval-discharge roller 7a are driven. Also, the cut sheet 12 and the ink sheet 19 are transported to the image recording portion 17, where the cut sheet 12 is printed on according to the image retrieved at the CCD scanner 8. Afterward, the document 4 and the cut sheet 12 are discharged from the facsimile machine 1.

Figure 2:
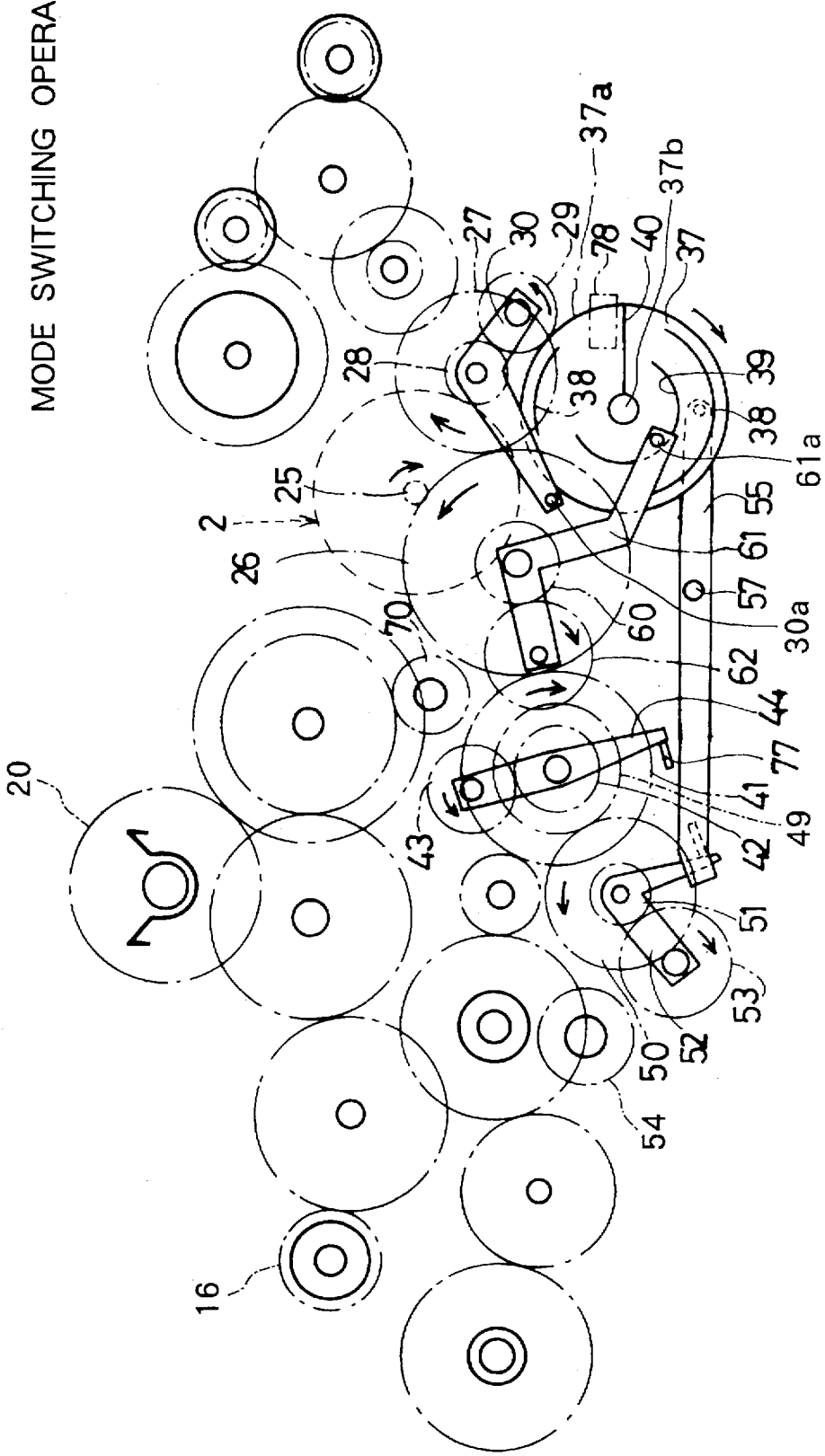
FIG. 2 is a side view showing transmission of rotation power from a control motor during a document-retrieval mode of the facsimile machine.
Figure 3:
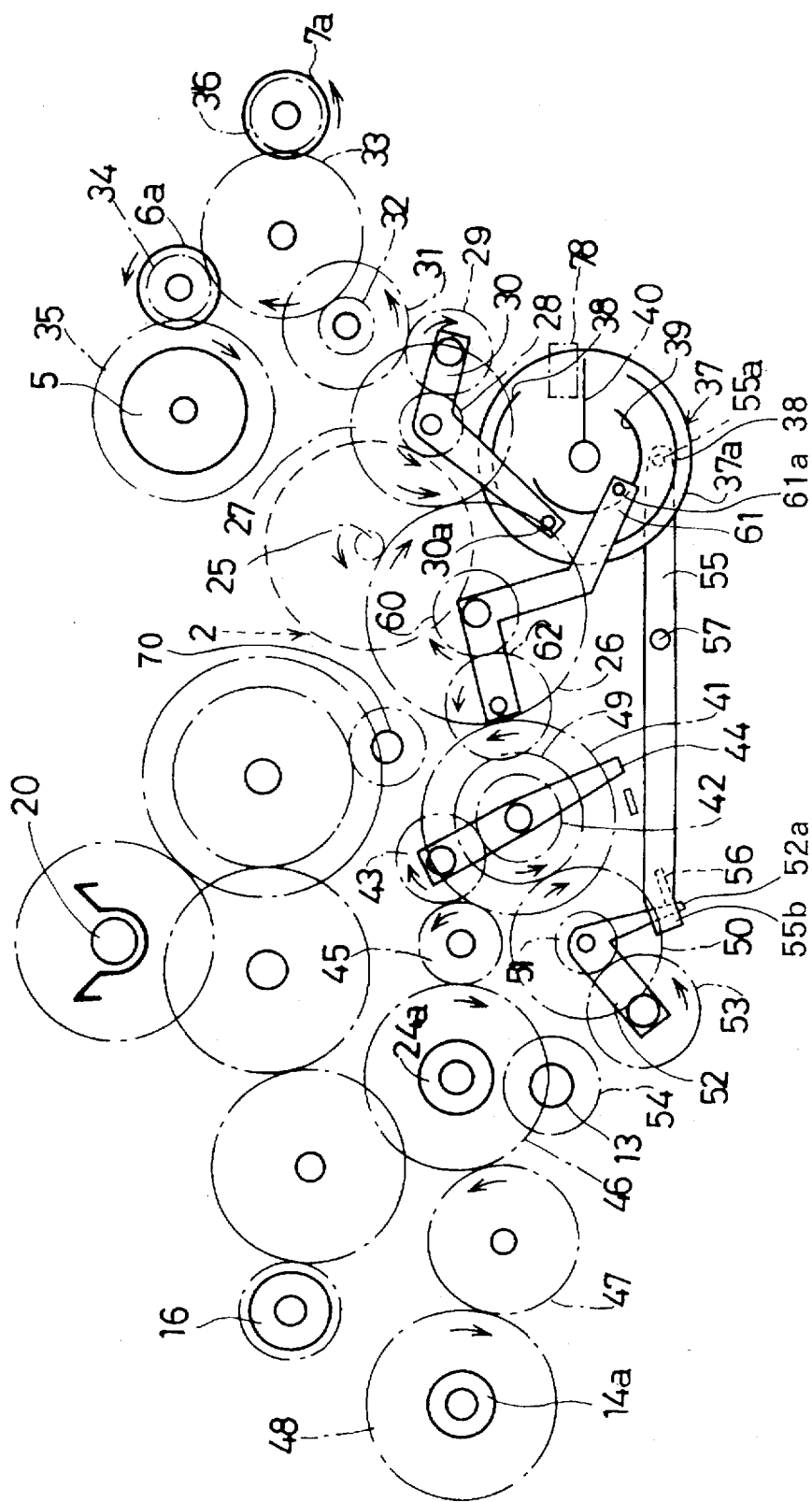
FIG. 3 is a side view showing transmission of rotation power from the control motor during a mode switching operation of the facsimile machine.

FIG. 2 is a side view showing a control motor 2, various gear trains, and a rotatable switching cam 37 of the facsimile machine 1 during a mode switching operation, wherein drive of the control motor 2 rotates the switching cam 37 into different phases depending on a desired mode. FIGS. 3 through 7 are side views showing various modes of the facsimile machine 1, wherein the control motor 2 drives the various gear trains depending on phase of the switching cam 37.

Figure 8:
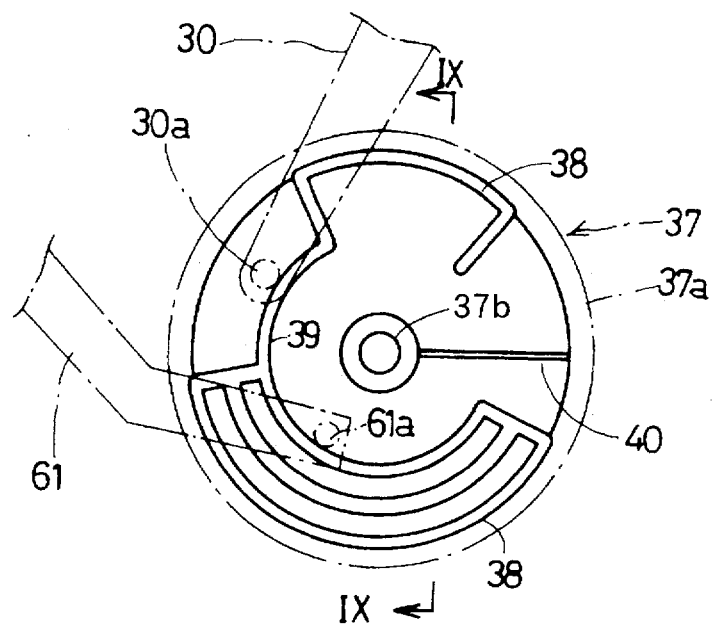
FIG. 8 is a side view showing a first side of a switching cam.

The switching cam 37 is a disk shaped member mounted on a shaft 37b. The switching cam 37 has a first side shown in FIG. 8 and a second side shown in FIG. 10. The first side of the switching cam 37 has an outer arc-shaped first cam surface 38 and an inner arc-shaped second cam surface 39 formed in a predetermined phase relationship for setting the modes of the facsimile machine 1 as will be described in more detail below with reference to the individual modes. A standard line 40 of the switching cam 37 can be used as a reference for the phase of the switching cam 37. The second side of the switching cam 37 is formed with a cam groove 58. A gear 37a is formed at the outer peripheral surface of the switch cam 37.

The motor 2 is a stepping motor capable of rotating in a forward direction, that is, clockwise as viewed in FIGS. 2 through 7, and a reverse direction, that is, counterclockwise as viewed in FIGS. 2 through 7. The control motor 2 is driven to rotate clockwise only during the mode switching operation and to rotate counterclockwise during the various modes of the facsimile machine 1 as determined by the phase of the switching cam 37.

The following is an explanation of gears which are rotated by rotation of the control motor 2, regardless of the phase of the switching cam 37 or the rotation direction of the control motor 2. As shown in FIG. 2, a pinion 25 of the control motor 2 is in constant engagement with a first common gear 26. A first sun gear 60 is provided to rotate integrally with the first common gear 26. The first common gear 26 is in constant engagement with a second common gear 27. A second sun gear 28 rotates integrally with the second common gear 27.

The first common gear 26 is also in constant engagement with a third common gear 41, which rotates integrally with small gear 49 and a third sun gear 42. A fourth common gear 50 is provided in constant engagement with the small gear 49. A fourth sun gear 51 is provided to rotate integrally with the fourth common gear 50.

Four planetary gears are provided in addition to the above-described gears. A first planetary gear 62 in constant engagement with the first sun gear 60 is disposed on one tip of a first lever 61, which is freely pivotally provided on an axial shaft of the first common gear 26. A tip pin 61a at the other tip of the first lever 61 is selectively in abutment with the second cam surface 39, depending on the phase of the switching cam 37.

A second planetary gear 29 in constant engagement with the second sun gear 28 is disposed on one tip of a second lever 30 for controlling position of the second planetary gear 29. The second lever 30 is provided so as to be freely pivotal around the axis of the second sun gear 28 and is provided with a guide pin 30a at its tip opposite the tip to which the second planetary gear 29 is attached. The guide pin 30a is selectively in abutment with the first cam surface 38, depending on the phase of the switching cam 37.

A third planetary gear 43 constantly engaged with the third sun gear 42 is attached to a third lever 44, which is attached to freely rotated on the axial shaft of the third sun gear 42. It should be noted that the third lever 44 is not directly or indirectly engaged with the switching cam 37, and so is unaffected by the phase of the switching cam 37.

Figure 9:
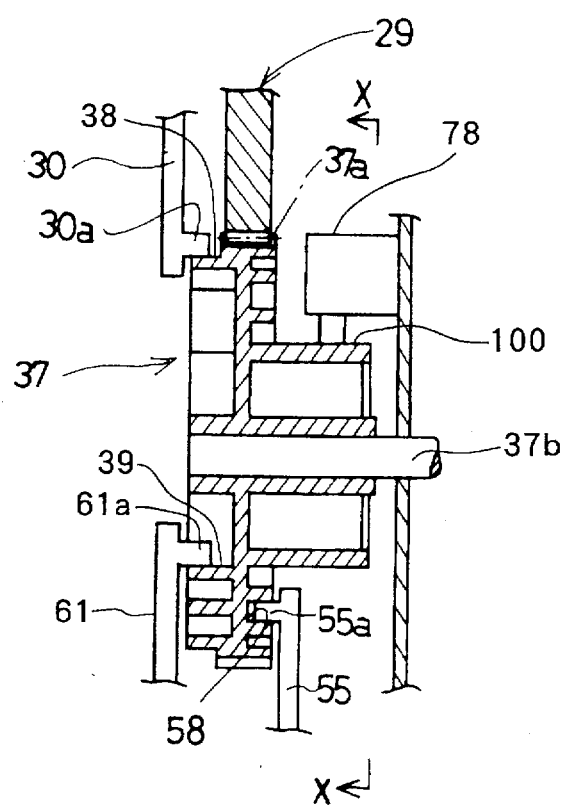
FIG. 9 is a cross-sectional view of the switching cam taken along line IX—IX of FIG. 8.
Figure 10:
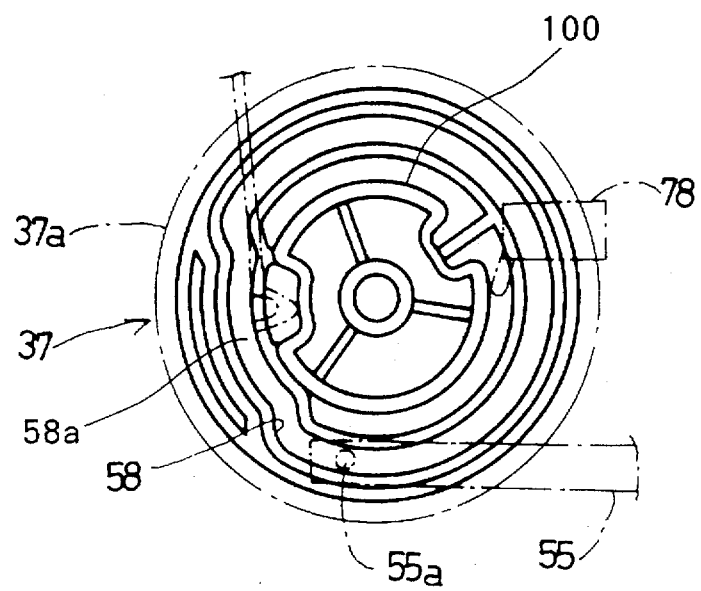
FIG. 10 is a side view showing a first side of a switching cam.

A fourth planetary gear 53 in constant engagement with the fourth sun gear 51 is provided to one tip of a substantially V-shaped fourth lever 52, which is provided to an axial shaft of the fourth sun gear 51 so as to pivot freely. A regulating lever 55 pivotally provided to a shaft 57 spans between the fourth lever 52 and the switching cam 37. An engagement tip 52a of the regulating lever 55 is positioned adjacent to a hooked tip 55b of the regulating lever 55. A tip pin 55a is provided to an opposite tip of the regulating lever 55. As shown in FIGS. 9 and 10, the tip pin 55a is freely slidably engaged in the cam groove 58 on the second surface of the switching cam 37.

Next, a description will be provided for operation of the various gear trains during the various modes of the facsimile machine 1. First, operation of gear trains in the document-retrieval mode will be explained while referring to FIG. 3. In the document-retrieval mode, the standard line 40 of the switching cam 37 is at a three o'clock phase. An operator sets a document 4 to be transmitted on the document tray 3 and starts transmission operations. This causes the motor 2 to rotate counterclockwise. The counterclockwise rotation of the motor 2 is transmitted via the motor pinion 25 and the first common gear 26 to the second common gear 27, which rotates counterclockwise as a result. Because the second sun gear 28 rotates integrally with the second common gear 27 and is constantly engaged with the second planetary gear 29, the counterclockwise rotation of the second common gear 27 is transmitted to the second planetary gear 29, which rotates clockwise as a result. Counterclockwise rotation of the second common gear 27 urges the second lever 30 to pivot counterclockwise.

Because the switching cam 37 is at the three o'clock phase, the guide pin 30a falls to the second cam surface 30 so that the second lever 30 pivots counterclockwise. This brings the second planetary gear 29 into engagement with a transmission gear 31 of a document-transport gear train, which also includes transmission gears 32, 33, and 34 and which transmits rotation of the second planetary gear 29 to the retrieval transport roller 6a. The retrieval transport roller 6a is driven to rotate counterclockwise as a result. Also, rotation of the transmission gear 34 is transmitted by a gear 35 to rotate the retrieval separation roller 5 clockwise. Further, the rotation of the transmission gear 33 is transmitted by a gear 36 to rotate the retrieval-discharge roller 7a.

After the last document is discharged, the motor 2 rotates clockwise so that the switching cam 37 is rotated one complete turn of 360° into its home position shown in FIG. 2. When the switch cam 37 is in its home position, its standard line 40 is stopped at the three o'clock phase shown in FIG. 2 and the gear 37a of the switch cam 37 is engaged with the second planetary gear 29.

It should be noted that while in the document-retrieval mode, the drive rotation of the control motor 2 is also transmitted to the transport roller 14a and the discharge roller 24a. Although power from the control motor 2 need not be transmitted to the sheet-supply/discharge gear train in the document retrieval mode, the switching cam 37 and related configuration can be produced less expensively with this configuration. That is, when the control motor 2 is driven to rotate counterclockwise, counterclockwise rotation of the motor pinion 25 rotates the first common gear 26 clockwise. The third common gear 41 engaged with the first common gear 26 is therefore rotated counterclockwise. The third sun gear 42 provided to rotate integrally with the third common gear 41 rotates counterclockwise as a result. Because the third planetary gear 43 is constantly engaged with the third sun gear 42 and is attached to a third lever 44, which is attached to freely rotated on the axial shaft of the third sun gear 42, counterclockwise rotation of the third sun gear 42 pivots the third lever 44 counterclockwise, which brings the third planetary gear 43 into engagement with an intermediate gear 45 of a sheet-transport/discharge gear train for driving the discharge roller 24a and the transport roller 14a.

The intermediate gear 45 is in constant engagement with a discharge gear 46, which rotates integrally with and on the same axis as the discharge roller 24a. Therefore, counterclockwise rotation of the intermediate gear 45 drives the discharge roller 24a to rotate clockwise via the discharge gear 46. The discharge gear 46 is also constantly engaged with a second intermediate gear 47, which in turn is constantly engaged with a transport gear 48. The transport gear 48 and the transport gear 14a rotate integrally on the same axis, so clockwise rotation of the discharge roller 46 causes the transport roller 14a to rotate counterclockwise.

Counterclockwise rotation of the third common gear 41 is also transmitted via the small gear 49, and the fourth common gear 50 to pivot the fourth lever 52 clockwise and via the fourth sun gear 51 to rotate the fourth planetary gear 53 counterclockwise. However, when the fourth lever 52 pivots clockwise, the engagement tip 52a of the fourth lever 52 abuts the hooked tip 55b of the regulating lever 55, thereby preventing the fourth lever 52 from pivoting further. As a result, the fourth planetary gear 53 freely rotates counterclockwise without engaging with a sheet-supply gear 54 of a sheet-supply gear train for driving the sheet-supply roller 13.

Here, the mode switching operation for switching from one mode to another, for example, from the document-retrieval mode to another mode, will be explained. After completion of operations in one of the modes, during which the control motor 2 is rotated counterclockwise, the control motor 2 is rotated clockwise as shown in FIG. 2. The motor pinion 25 rotates clockwise, thereby rotating the second common gear 27 clockwise via the first common gear 26. As a result, the second planetary gear 29, which is in constant engagement with the second sun gear 28 rotating integrally with the second common gear 27, pivots the second lever 30 clockwise, thereby bringing the second planetary gear 29 into engagement with the gear 37a at the peripheral surface of the switching cam 37. Once the second planetary gear 29 and the gear 37a are in engagement, the counterclockwise rotation of the second planetary gear 29 rotates the switching cam 37 clockwise.

Because the guide pin 30a of the second lever 30 can be selectively brought into abutment with the first cam surface 38, the pin 61a of the first lever 61 can be selectively brought into abutment with the second cam surface 39, and the tip pin 55a of the regulating lever 55 is engaged with and controlled by the cam groove 58, the degree to which the first lever 61, the second lever 30, and the regulating lever 55 can pivot can be controlled by selecting the phase at which the switching cam 37 stops. This enables switching between the various modes of the facsimile machine.

It should be noted that a sensor 78 is provided for detecting phases of the switching cam 37 for the document-retrieval mode and for the record mode. As shown in FIG. 10, a contact switch of the sensor 78 is urged against a cam surface 100 on the second side of the switching cam 37. The sensor 78 is turned off when in contact with the cam surface 100 and turned on when the contact switch falls into either of two notches of the cam surface 100. The document-retrieval mode is determined when the sensor 78 is off for a long duration of time and the record mode is determined when the sensor is off for a short duration of time.

During the mode switching operation, that is, when the switching cam 37 is rotating, clockwise rotation of the control motor 2 is transmitted via the first common gear 26 and the first sun gear 60 to pivot the first lever 61 and the first planetary gear 62 counterclockwise. This lifts the pin 61a of the first lever 61 towards the shaft 37b of the switching cam 37 and away from the second cam surface 39 so that the first planetary gear 62 remains separated from an intermediate gear 70 of a recording portion gear train for driving the platen roller 16 and the take-up roller 20. Therefore, the platen roller 16 and the take-up roller 20 are not driven.

The third common gear 41 is rotated clockwise via the first common gear 26. Therefore, the third lever 44 pivots clockwise around the third sun gear 42. The third planetary gear 41 pivots in association with the third lever 44, out of engagement with the intermediate gear 45 of the sheet-feed/discharge gear train. Therefore, rotation of the motor 2 is cut off from the sheet-transport/discharge gear train. A stopper 77 for preventing the third lever 44 from pivoting clockwise beyond a predetermined position is disposed at the predetermined position. Also, the fourth common gear 50 rotates counterclockwise via the small gear 49 so that the fourth lever 52 and the fourth planetary gear 53 pivot counterclockwise around the fourth sun gear 51. This separates the fourth planetary gear 53 from the sheet-supply gear 54 of the sheet-supply gear train. Therefore, the rotation of the motor 2 is not transmitted to the sheet-supply roller 13. It should be noted that the fourth planetary gear 53 itself rotates clockwise.

Figure 11:
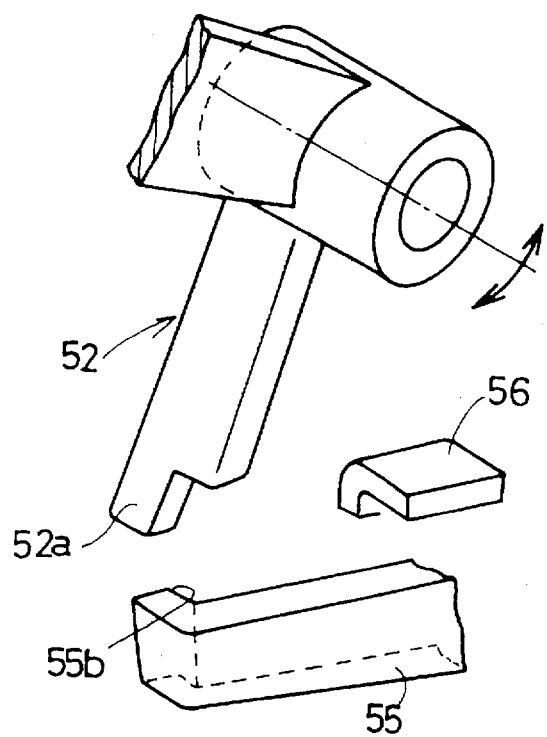
FIG. 11 is an exploded view schematically showing positional relationship of a fourth lever and a regulating lever during the sheet-supply mode.

Next, operation of gear trains in the sheet-supply mode will be explained while referring to FIG. 4. Before start of the sheet-supply mode, the mode switching operation is performed to rotate the switching cam 37 clockwise 72 degrees from its home position by driving the control motor 2 to rotate clockwise a predetermined number of steps, for example, 164 steps, and then stopping drive after the predetermined number of steps is counted. The tip pin 55a of the regulating lever 55 is guided by the cam groove 58 into a section 58a of the cam groove 58 nearer to the shaft 37b so that the regulating lever 55 pivots, or tilts, counterclockwise. As a result, the hooked tip 55b of the regulating lever 55 separates from the tip 52a of the fourth lever 52 as shown in FIG. 11.

Figure 4:
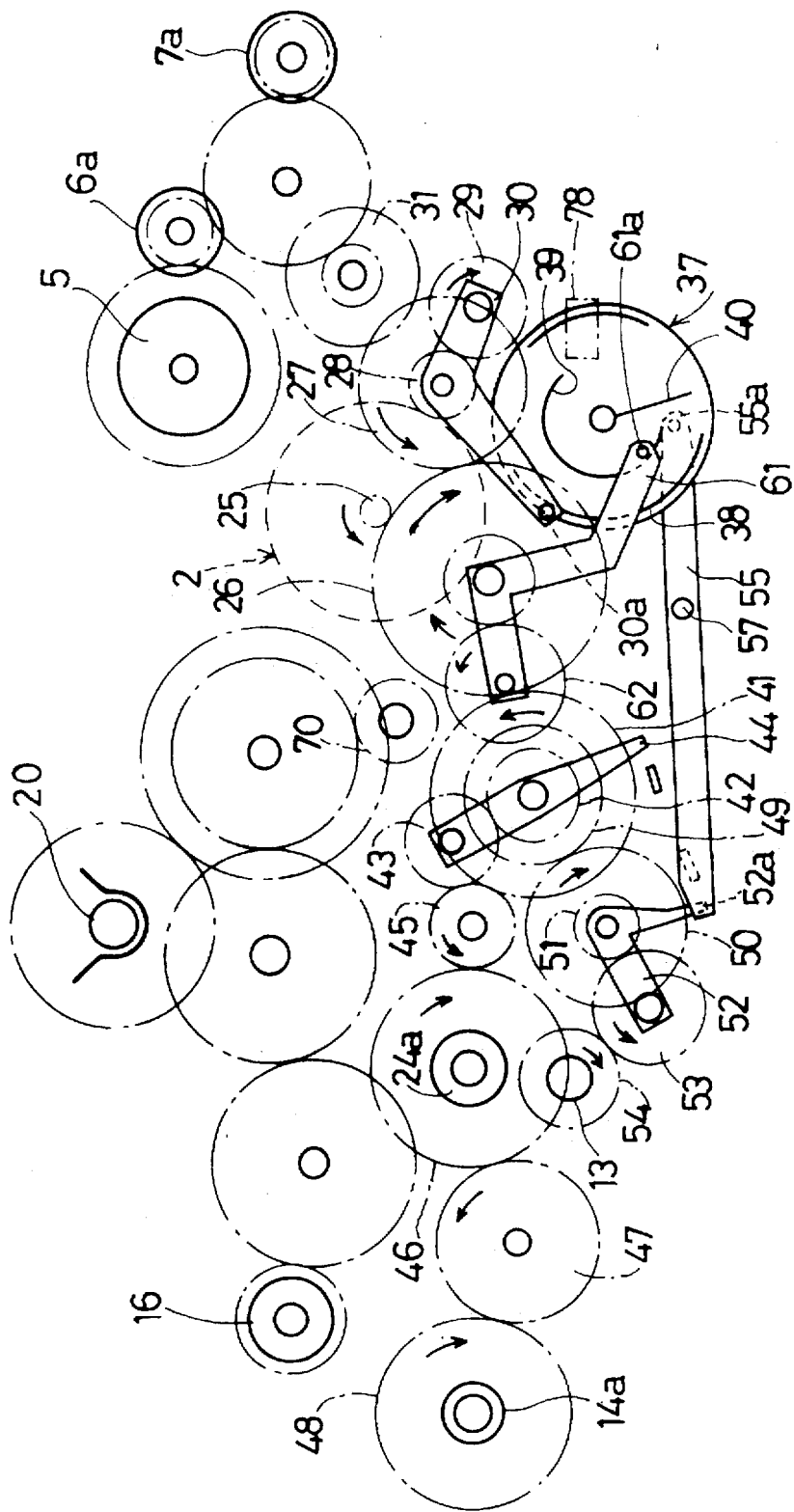
FIG. 4 is a side view showing transmission of rotation power from the control motor during a sheet-supply mode of the facsimile machine.

When the motor 2 is rotated counterclockwise in this condition, as shown in FIG. 4, the first common gear 26 rotates clockwise and the third common gear 41 rotates counterclockwise. Therefore, the fourth sun gear 51 rotates clockwise via the small gear 49 and the fourth common gear 50. The fourth lever 52 and the fourth planetary gear 53 pivot clockwise in association with the rotation of the fourth sun gear 51. Because, as shown in FIG. 11, the hooked tip 55b of the regulating lever 55 is separated from the tip 52a of the fourth lever 52, the fourth lever 52 is pivoted clockwise so that the fourth planetary gear 53 and the sheet-supply gear 54 come into engagement, thereby driving the sheet-supply roller 13.

The third planetary gear 43 pivots counterclockwise around the third sun gear 42 into engagement with the intermediate gear 45 of the sheet-transport/discharge gear train. In the same manner as in the document-retrieval mode, the sheet-discharge roller 24a is driven to rotate clockwise via the sheet-discharge gear 46. Also, the transport roller 14a is driven to rotate clockwise via the sheet-discharge gear 46, the second intermediate gear 47, and the transport gear 48. Accordingly, a cut sheet 12 is transported from the sheet-supply cassette 10 until its front edge is directly in front of the image recording portion 17. Also, a cut sheet 12 with an image recorded thereon by the image recording portion 17 is discharged from the facsimile machine 1.

It should be noted that the second common gear 27 rotates counterclockwise so that the second lever 30 and the second planetary gear 29 pivot counterclockwise, thereby separating the second planetary gear 29 from the peripheral gear 37a of the switching cam 37. Although, the second planetary gear 29 pivots toward the transmission gear 31 of the document-transport gear train, engagement between the second planetary gear 29 and the transmission gear 31 is prevented because the guide pin 30a of the second lever 30 abuts the first cam surface 38 of the switching cam 37. Therefore, the separation roller 5, the transport roller 6a, and the discharge roller 7a are not driven so a document 4 is not transported through the document retrieval portion. It should be noted however that the second sun gear 28 rotates counterclockwise and the second planetary gear 29 rotates clockwise.

The tip pin 61a of the first lever 61 is restricted by the second cam surface 39 so that the intermediate gear 70 of the recording portion gear train is maintained isolated from rotation of the control motor 2. Therefore, the platen roller 16 and the take-up reel 20 are not driven.

Figure 5:
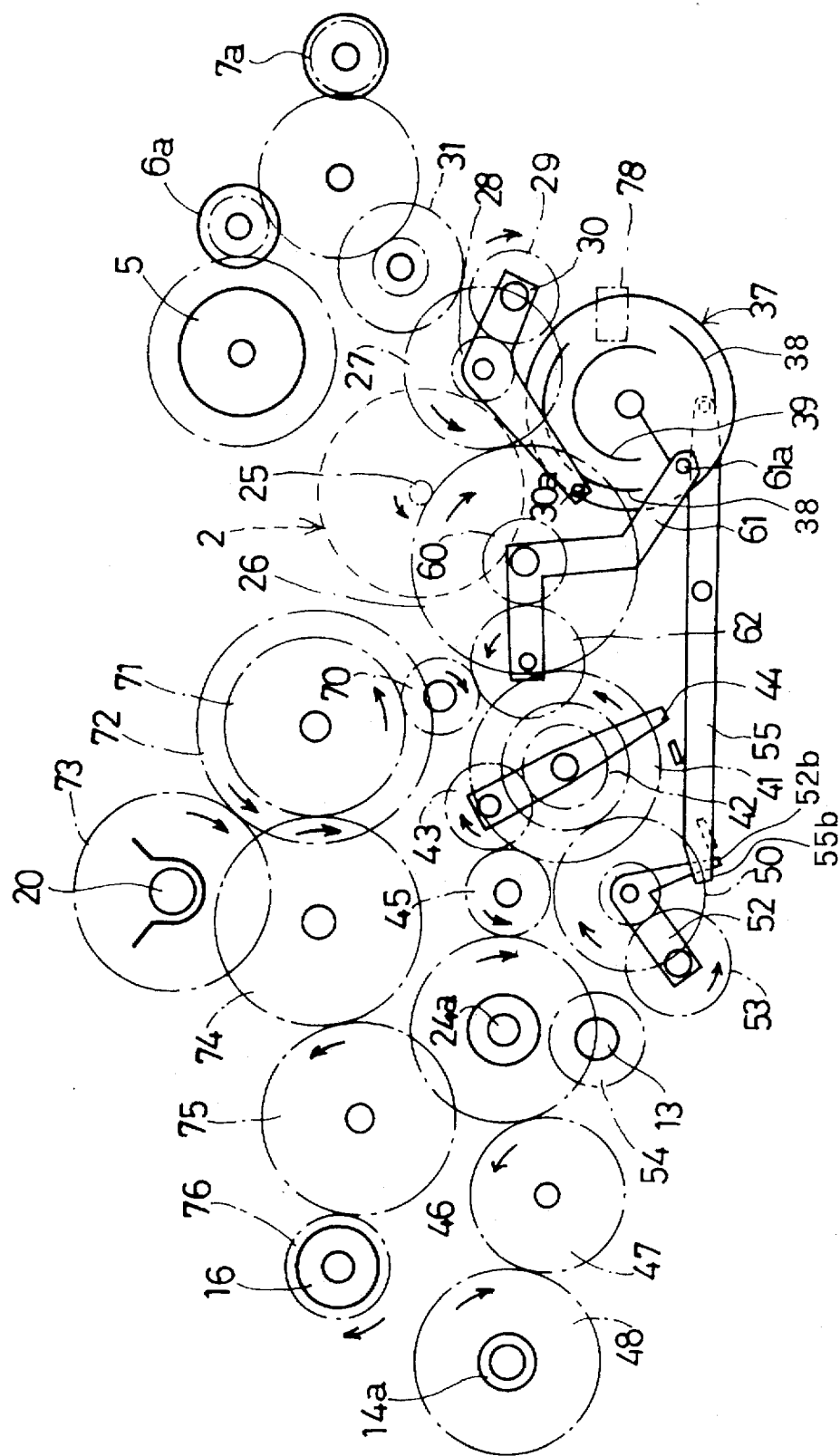
FIG. 5 is a side view showing transmission of rotation power from the control motor during a record mode of the facsimile machine.

Next, operation of gear trains in the record mode will be explained while referring to FIG. 5. To switch from the sheet-supply mode to the record mode, the control motor 2 is rotated counterclockwise 124 steps, which will rotate the switching cam 37 clockwise 144 degrees from the home position shown in FIG. 2. When in this condition the control motor 2 is rotated counterclockwise, the first lever 61 and the first planetary gear 62 pivot clockwise via the first common gear 26 and the first sun gear 60. Because the tip pin 61a of the first lever 61 is released from the second cam surface 39, the first lever 61 pivots clockwise, bringing the first planetary gear 62 into engagement with the intermediate gear 70 of the recording portion gear train. A sun gear 71 in constant engagement with the intermediate gear 70 is rotated counterclockwise as a result. A sun gear 72 rotates counterclockwise in association with the intermediate gear 70. A transmission gear 73 in constant engagement with the sun gear 72 and sharing the same shaft axis as the take-up reel 20 is rotated clockwise by the rotation of the sun gear 72 so that the take-up reel 20 rotates as well. Also, rotation of the transmission gear 71 rotates an intermediate gear 74 in constant engagement therewith. The rotation of the intermediate gear 74 is transmitted to the platen roller 16 via a transmission gear 75 and a platen gear 76, which shares the same shaft as the platen roller 16.

Therefore in the record mode, the ink sheet 19 and a cut sheet 12 positioned directly in front of the image recording portion 17 are transported through the image recording portion 17 while the cut sheet 12 is printed on. The sheet-transport/discharge gear train is also driven as in the document-retrieval mode so that the transport roller 14a and the sheet-discharge roller 24a are driven to discharge the cut sheet 12 from the discharge portion. On the other hand, although the fourth lever 52 and the fourth planetary gear 53 pivot clockwise, their progress is stopped by the hooked tip 55b of the regulating lever 55 so that the fourth planetary gear 53 rotates freely counterclockwise without engaging with the sheet-supply gear 54 of the sheet-supply gear train. Therefore, a new cut sheet 12 is not supplied by the sheet-supply roller 13.

Also, the second common gear 27 rotates counterclockwise so that, via the second sun gear 28, the second lever 30 and the second planetary gear 29 pivot counterclockwise, thereby separating the second planetary gear 29 from the peripheral gear 37a of the switching cam 37. Although the second lever 30 pivots counterclockwise and the second planetary gear 29 approaches the transmission gear 31 of the document-transport gear train, engagement between the second planetary gear and the transmission gear 31 is prevented because the guide pin 30a of the second lever 30 abuts the first cam surface 38. Therefore, the separation roller 5, the transport roller 6a, and the discharge roller 7a are not driven so that a document 4 is not transported through the document retrieval portion.

Next, operation of gear trains in the copy mode will be explained while referring to FIG. 6. When the facsimile machine 1 is switched to the copy mode from the record mode, the control motor 2 is rotated 144 steps clockwise so that the switching cam 37 rotates 216 degrees clockwise from the home position shown in FIG. 2 into a copy mode phase shown in FIG. 6. When the control motor is rotated counterclockwise while the switching cam 37 is in this phase, the first common gear 26 rotates clockwise and the second common gear 27 rotates counterclockwise. The second lever 30 and the second planetary gear 29 pivot counterclockwise in association with rotation of the second sun gear 28 so that the second planetary gear 29 separates from the peripheral gear 37a of the switching cam 37.

Because the guide pin 30a of the second lever 30 fell out of abutment with first cam surface 38 when the switching cam 37 was moved into the copy mode phase, the guide pin 30a is no longer regulated by the first cam surface 38. Therefore, the second planetary gear 29 pivots into engagement with the transmission gear 31 of the document-transport gear train so that the separation roller 5, the transport roller 6a, and the discharge roller 7a are driven via the transmission gears 32, 33, and 34, and the gears 35 and 36. Therefore, a document 4 to be copied is transported past the CCD scanner 8, where characters and images are retrieved therefrom.

Here, the facsimile machine 1 is switched to the sheet-supply mode, whereupon the sheet-supply roller 13 is driven so that a cut sheet 12 is supplied from the supply-sheet cassette 10 until its front edge is directly in front of the print position of the image recording portion 17.

Figure 6:
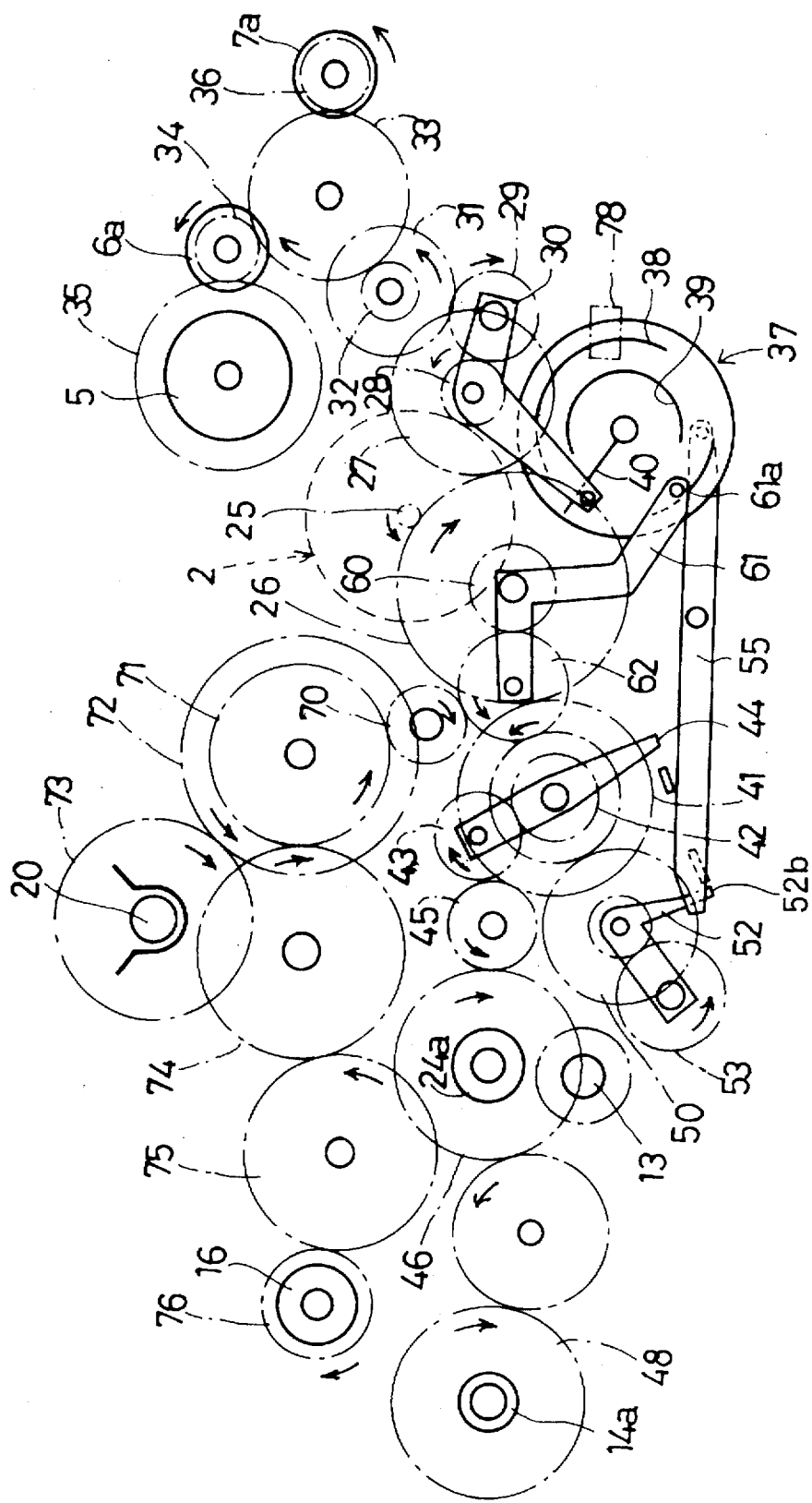
FIG. 6 is a side view showing transmission of rotation power from the control motor during a copy mode of the facsimile machine.

Afterward, the switching cam 37 is switched into the copy mode phase shown in FIG. 6 so that the tip pin 61a of the first lever 61 is released from restriction by the second cam surface 39. Therefore, the first lever 61 pivots clockwise and the first planetary gear 62 pivots into engagement with the intermediate gear 70 of the recording portion gear train. As a result, the take-up reel 20 and the platen roller 16 are driven to rotate clockwise as described above.

The ink sheet 19 and cut sheet 12 positioned directly in front of the printing position of the printing portion 12 are transported while the cut sheet 12 is printed on. Also, the sheet-transport/discharge gear train is driven to rotate the transport roller 14a and the discharge roller 24a so that the cut sheet 12 is discharged from the discharge portion. Also, the fourth lever 52 and the fourth planetary gear 543 are pivoted clockwise, but the fourth planetary gear 53 only rotates freely counterclockwise without engaging with sheet-supply gear 54. Therefore, the sheet-supply roller 13 does not rotate and supply of a new cut sheet 12 is not performed.

Figure 7:
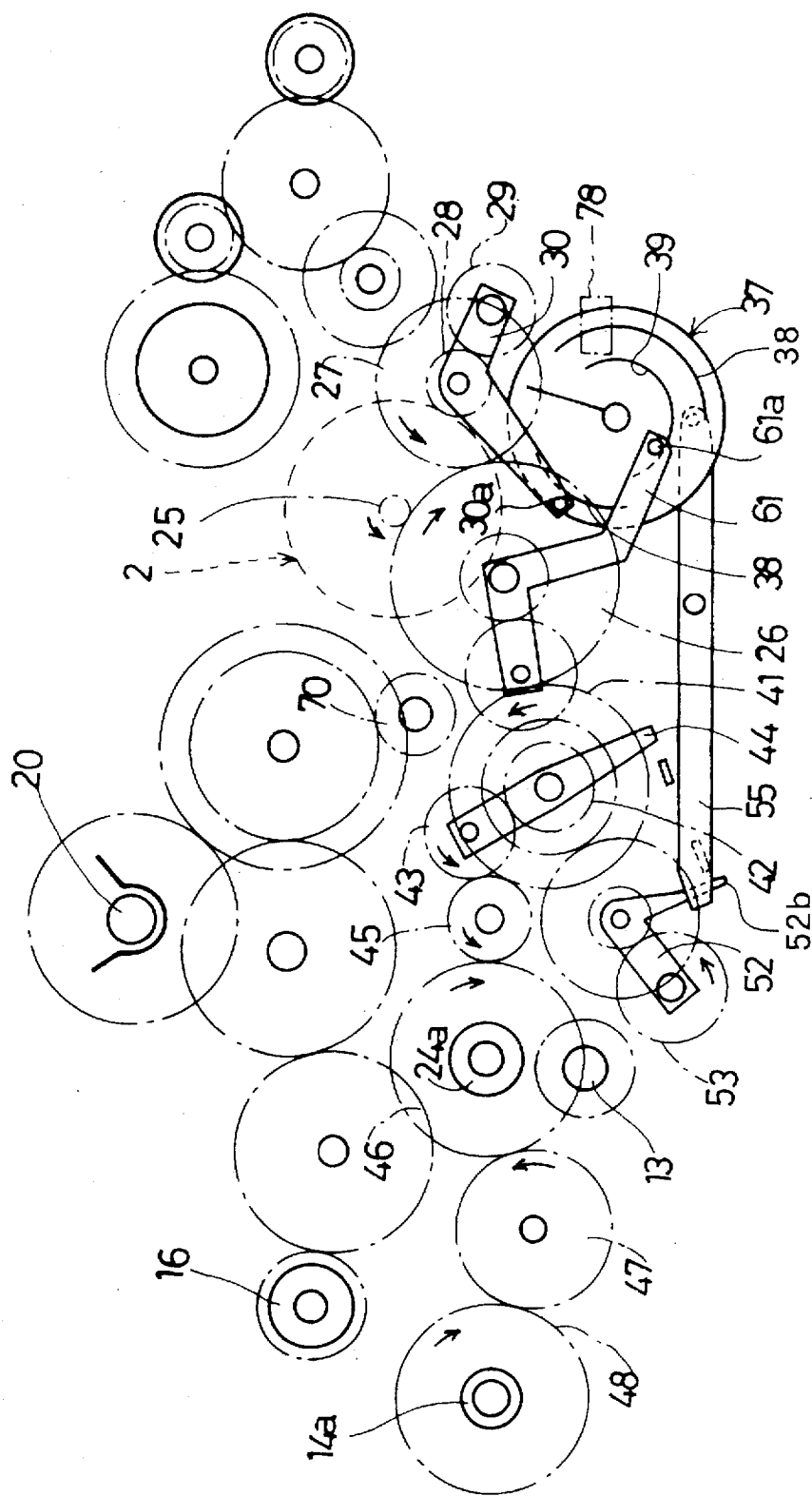
FIG. 7 is a side view showing transmission of rotation power from the control motor during a sheet-discharge mode of the facsimile machine.

Next, operation of gear trains in the sheet-discharge mode will be explained while referring to FIG. 7. To switch to the sheet-discharge mode from the copy mode, the control motor 2 is rotated clockwise 144 steps to rotate the switching cam 37 clockwise 288 degrees from the home position shown in FIG. 2.

In the sheet-discharge mode, the control motor 2 is rotated counterclockwise. Although the second lever 30 pivots counterclockwise, the guide pin 30a abuts against the first cam surface 38 of the switching cam 37, thereby restricting further pivoting movement of the second lever 30. Therefore, the second planetary gear 29 does not engage with the transmission gear 31 of the document-transport gear train. Also, the tip pin 61a of the first lever 61 is restricted by the second cam surface 39 so that second planetary gear 29 does not pivot into engagement with the intermediate gear 70 of the recording portion gear train. Therefore, the take-up reel 20 and the platen roller 16 are not driven.

Further, the third planetary gear 43 pivots into engagement with the intermediate gear 45 of the sheet-transport/discharge gear train, thereby driving rotation of the transport roller 14a and the discharge roller 24a to discharge a cut sheet 12 from the discharge portion. However, the fourth planetary gear 53 only rotates freely without engaging with the sheet-supply gear 54 of the sheet-supply gear train.

Therefore, the sheet-supply roller 13 does not rotate so that supply of a new cut sheet 12 is not performed.

While the invention has been described in detail with reference to specific embodiments thereof, it would be apparent to those skilled in the art that various changes and modifications may be made therein without departing from the spirit of the invention, the scope of which is defined by the attached claims.

For example, gears for transmitting drive to the document-transport gear train, the recording portion gear train, the sheet-transport/discharge gear train, and the sheet-supply gear train could be juxtaposed in parallel and a selection gear could be disposed near lead gears of the gear trains so as to be shiftable along its axis of rotation into and out of engagement with the lead gears. A control motor could be provided for shifting the selection gear along its axis of rotation and into engagement with selected gear trains. Then the power from the control motor could be used to drive the gear trains.

In a facsimile machine according to the present invention, a single control motor is driven in one direction a predetermined amount to rotate a switching cam into a predetermined phase, which depends on a desired mode. The phase of the switching cam regulates the angle to which levers engaged therewith can pivot. Therefore, when the control motor is driven to rotate in an opposite direction, the planetary gears attached to the levers can be selectively brought into engagement with corresponding gear trains, depending on the angle to which the levers are allowed to pivot. Because this is accomplished using a single control motor, a cam, and a plurality of levers attached with planetary gears, the facsimile machine can be produced less expensively than conventional facsimile machines, which require two control motors and separate gear trains for each mode.

Because the ink sheet is transported through the recording portion only during the record mode and the copy mode, unnecessary consumption of the ink sheet can be prevented so that running costs are less.

What is claimed is:

1. A facsimile machine comprising:
   a motor capable of being driven to selectively produce forward power and reverse power;
   a first operation portion for performing a first operation of the facsimile machine;
   a second operation portion for performing a second operation of the facsimile machine;
   a first gear train for, when the facsimile machine is in a first mode, transmitting reverse power from the motor to drive the first operation portion;
   a second gear train for, when the facsimile machine is in a second mode, transmitting reverse power from the motor to drive the second operation portion; and
   mode switching means driven by forward power from the motor to switch the facsimile machine between the first mode and the second mode.

2. A facsimile machine as claimed in claim 1, wherein the first operation portion includes a document retrieval portion and the second operation portion includes an image recording portion.

3. A facsimile machine as claimed in claim 2, wherein the switching means includes a switching cam rotated by forward power from the motor into one of a first phase for the first mode and a second phase for the second mode.

4. A facsimile machine as claimed in claim 3, further comprising:
   a first lever with a first planetary gear attached thereto and, during the first mode, pivoted by reverse power of the motor to an extent which is regulated by the first phase of the switching cam and which enables the first planetary gear to engage with the first gear train, so that reverse power of the motor is transmitted to the first gear train; and
   a second lever with a second planetary gear attached thereto and, during the second mode, pivoted by reverse power of the motor to an extent which is regulated by the second phase of the switching cam and which enables the second planetary gear to engage with the second gear train, so that reverse power of the motor is transmitted to the second gear train.

5. A facsimile machine as claimed in claim 4, wherein the second mode includes a recording mode and a copy mode and wherein the image recording portion includes an ink sheet supply roller for supplying an ink sheet with which recording is performed during the recording mode and the copy mode and engaged with a gear of the first gear train so that the ink sheet supply roller is driven only during the recording mode and the copy mode.

6. A facsimile machine as claimed in claim 2, wherein the second mode includes a recording mode and a copy mode and wherein the image recording portion includes an ink sheet supply roller for supplying an ink sheet with which recording is performed during the recording mode and the copy mode and engaged with a gear of the first gear train so that the ink sheet supply roller is driven only during the recording mode and the copy mode.

7. A facsimile machine as claimed in claim 6 further comprising a sheet-transport/sheet discharge gear train for feeding a cut sheet from a transport preparation position located upstream, in a sheet-supply direction, from the image recording portion, through the image recording portion, and to a discharge portion.

8. A facsimile machine as claimed in claim 7 further comprising a third lever with a planetary gear attached thereto and for transmitting reverse power of the motor to the sheet-transport/sheet discharge gear train in both the first mode and the second mode.

9. A facsimile machine as claimed in claim 2 further comprising a sheet-transport/sheet discharge gear train for feeding a cut sheet from a transport preparation position located upstream, in a sheet-supply direction, from the image recording portion, through the image recording portion, and to a discharge portion.

10. A facsimile machine as claimed in claim 9 further comprising a third lever with a planetary gear attached thereto and for transmitting reverse power of the motor to the sheet-transport/sheet discharge gear train in both the first mode and the second mode.

11. A facsimile machine as claimed in claim 1, wherein the switching means includes a switching cam rotated by forward power from the motor into one of a first phase for the first mode and a second phase for the second mode.

12. A facsimile machine as claimed in claim 11, further comprising:
   a first lever with a first planetary gear attached thereto and, during the first mode, pivoted by reverse power of the motor to an extent which is regulated by the first phase of the switching cam and which enables the first planetary gear to engage with the first gear train, so that reverse power of the motor is transmitted to the first gear train; and
   a second lever with a second planetary gear attached thereto and, during the second mode, pivoted by reverse power of the motor to an extent which is regulated by the second phase of the switching cam and which enables the second planetary gear to engage with the second gear train, so that reverse power of the motor is transmitted to the second gear train.

13. A facsimile machine, comprising:

a motor capable of being driven to selectively produce forward power and reverse power;

first and second operation portions for performing first and second operations, respectively, during first and second modes, respectively, of the facsimile machine, both the first and second operation portions being driven by reverse power of the motor; and mode switching means driven by forward power from the motor to switch the facsimile machine between the first mode and the second mode.

14. A facsimile machine as claimed in claim 13, further comprising:

a third operation portion for performing a third operation during a third mode of the facsimile machine, the third operation portion being driven by reverse power of the motor wherein the mode switching means further switches the facsimile machine between the first and second modes and the third mode as driven by forward power from the motor.

* * * * *